United States Patent
Beyer

(10) Patent No.: US 8,246,097 B2
(45) Date of Patent: Aug. 21, 2012

(54) HOLDING DEVICE

(75) Inventor: Kurt Beyer, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 234 days.

(21) Appl. No.: 12/721,349

(22) Filed: Mar. 10, 2010

(65) Prior Publication Data

US 2010/0230457 A1 Sep. 16, 2010

(30) Foreign Application Priority Data

Mar. 11, 2009 (DE) .................. 10 2009 012 736

(51) Int. Cl.
*B60R 13/00* (2006.01)
(52) U.S. Cl. ............. 296/24.34; 296/37.8; 224/400
(58) Field of Classification Search .......... 296/24.34, 296/37.1, 37.8; 224/400
See application file for complete search history.

(56) References Cited

U.S. PATENT DOCUMENTS

| | | | |
|---|---|---|---|
| 6,547,299 B2 | 4/2003 | Atanasiu et al. | |
| 7,029,048 B1 | 4/2006 | Hicks et al. | |
| 7,591,498 B2 * | 9/2009 | Busha et al. | 296/24.34 |
| 2003/0197392 A1 * | 10/2003 | Clark et al. | 296/24.1 |
| 2004/0084920 A1 * | 5/2004 | Trimble et al. | 296/37.8 |
| 2005/0035618 A1 | 2/2005 | Toth et al. | |
| 2010/0013256 A1 | 1/2010 | Arndt et al. | |

FOREIGN PATENT DOCUMENTS

| | | |
|---|---|---|
| DE | 19908139 A1 | 8/2000 |
| DE | 102006030476 A1 | 1/2008 |
| WO | 2008003406 A1 | 1/2008 |

OTHER PUBLICATIONS

German Search Report issued Aug. 25, 2009 in German Patent Application No. 10 2009 012.736.4.
British Patent Office, British Search Report for British Application No. GB 1003048.4, Jun. 14, 2010.

* cited by examiner

*Primary Examiner* — Lori Lyjak
(74) *Attorney, Agent, or Firm* — Ingrassia Fisher & Lorenz, P.C.

(57) ABSTRACT

A holding device is provided for holding articles of daily use. The holding device can be arranged in an interior space of a motor vehicle and includes, but is not limited to a holding element and at least two mounting elements in which the holding element is fastened. The mounting elements can be arranged within a rail system arranged within the interior space of the motor vehicle in such a manner that the mounting elements can be mounted freely movable within the rail system independent of each other. Because of this it is possible to make available a holding device for the holding of articles of daily use which can be arranged in an interior space of a motor vehicle and is characterized by high functionality at the same time.

15 Claims, 3 Drawing Sheets

HOLDING DEVICE

CROSS-REFERENCE TO RELATED APPLICATION

This application claims priority to German Patent Application No. 102009012736.4, filed Mar. 11, 2009, which is incorporated herein by reference in its entirety.

TECHNICAL FIELD

The invention relates to a holding device for holding articles of daily use, which can be arranged within an interior space of a motor vehicle, for example in order to store or safely place these articles of daily use in the interior space.

BACKGROUND

Articles of daily use, more preferably articles of daily use which could be required while driving, such as road maps, handbags, mobile phone, purse are usually placed loosely on the co-driver's seat, on one of the back seats or in the foot well of a motor vehicle. Doing so, however, poses the risk that the articles could fall over while driving, slide off the seats and as a result get under the seats when they are no longer within reach particularly of the driver, particularly when driving through curves or during braking operations the loosely placed articles can slide to and fro in the vehicle. If the driver should look for one of these articles in the region of the co-driver's seat for example while driving, the risk of an accident also increases.

It is therefore at least one object of the invention to make available a holding device for holding articles of daily use which can be arranged in an interior space of a motor vehicle, which makes possible safe holding of articles of daily use and is characterized by high functionality at the same time. In addition, other objects, desirable features and characteristics will become apparent from the subsequent summary and detailed description, and the appended claims, taken in conjunction with the accompanying drawings and this background.

SUMMARY

The holding device for the holding of articles of daily use according to an embodiment of the invention, wherein the holding device can be arranged in an interior space of a motor vehicle, comprises a holding element and two mounting elements, in which the holding element is fastened. The mounting elements can be arranged within a rail system arranged in the interior space of the motor vehicle in such a manner that the mounting elements can be guided freely moveable within the rail system independent of each other.

The holding element is preferentially embodied in form of a pouch or a bag which is fastened to two mounting elements which serve as handle elements. In the holding element articles of daily use which could be required while driving such as road maps, handbags, mobile phone, purse or toys of children travelling along can be deposited. At the same time, the holding element can be used as carry bag, for example as shopping bag, which preferentially while driving can be hooked into a rail system arranged in the interior space of the motor vehicle by means of the mounting elements. On leaving the vehicle, the holding element can be removed from the rail system by the occupants and taken along out of the vehicle. In that the mounting elements can be guided freely moveable within the rail system independent of each other the holding element can be closed or opened in the region of the mounting elements by sliding the mounting elements while it is placed within the rail system. The rail system preferentially comprises two rails which run parallel to each other, in which the preferentially rod-shaped mounting elements with their two end sections can be hooked.

By means of this holding device, it is possible in a simple manner to safely stow away articles of daily use while driving, without the articles being able to fall over or slide to and fro in the vehicle, so that the vehicle interior can also be protected. More preferably carry bags can be deposited in a space-saving manner and safely within the vehicle both in a position of use, when they are filled with articles, as well as in a position of non-use, in which they are for example wrapped around the mounting elements hooked into the rail system, while the holding element or the carry bag can be reached and utilized by the vehicle occupants at any time.

According to an embodiment of the invention, the rail system is arranged in a centre console of the motor vehicle. In that the rail system, in which the holding element can be arranged by means of the mounting elements, is placed in the centre console of the motor vehicle, the holding element is easily reachable by the driver the co-driver as well as by the occupants on the rear seat bench of the vehicle. The rail system arranged in the centre console of the motor vehicle preferentially extends from the instrument panel to behind the front seats in the region of the rear seat benches of the vehicle. The holding element or the mounting elements can preferentially be fastened in the rail system in the region between the two backrests of the driver's seat and the co-driver's seat, so that all occupants can easily get to the holding element without the holding element restricting or obstructing the vehicle occupants on the rear seat benches in the space available to them.

For fastening the holding device in the rail system, the mounting elements according to a preferred embodiment of the invention comprise a pin-shaped fastening element each on two opposite ends of a mounting element. These pin-shaped fastening elements can be hooked into the rails of the rail system, wherein the mounting elements of the holding device are freely movable in the rails of the rail system by means of the pin-shaped fastening elements. The rail system however can also comprise clearances within the rails in which the fastening elements can be securely hooked so that the holding device cannot slide to and fro in the rail system even during more severe braking operations or when driving through curves. In order to achieve secure fastening, a fastening element each is provided at an end of the mounting element which during fastening in the rail system points in the direction of the driver's seat and a fastening element on the opposite end of the mounting element, which during fastening in the rail system points in the direction of the co-driver's seat.

According to a further advantageous embodiment of the invention the fastening elements can be moved within the mounting element by means of an actuation element arranged on the mounting elements. The fastening elements can be moved out of the mounting element or also back into the interior space of the mounting element a certain distance by means of the actuation element. The actuation element is preferentially coupled with the pin-shaped fastening elements so that the fastening elements can be moved by means of the actuation element. For example by actuating the actuation element the fastening elements can be moved or retracted in the direction of the mounting elements so that the fastening elements are unhooked from the rails of the rail system and the holding element or the holding device can be released from the rails. The fastening elements arranged on the opposite ends of a mounting element can be coupled to each other by means of a spring mechanism. Through the spring mechanism the fastening elements can be easily moved within the mounting element for fastening and releasing the holding device in the rail system. In that two opposite fastening elements are coupled to each other by means of a spring mechanism, these can be moved as a function of each other which facilitates the movement sequence when introducing and releasing the fastening elements in the rail system.

According to an advantageous embodiment the actuation element is configured as a push button. The push button can be configured point-shaped or as a wider flat surface. On exertion of a force on the push button the fastening elements can be moved for example in the direction of the mounting elements so that the holding device can be released and as soon as the push button is no longer actuated, the fastening elements can be moved to the outside of the mounting elements so that the mounting elements can for example be hooked back in the rails. However, the actuation element can also be configured with a mechanism other than a push button.

For the safe, non-slip fastening of the mounting elements in the rail system the rail system can preferentially comprise clearances in which the fastening elements of the mounting elements can be engaged. Particularly when driving through sharp curves the mounting elements can thus be fixed in a fixed position so that the articles placed in the holding element can be securely stored. The clearances are preferentially arranged in the region of the rails of the rail system in which the fastening elements can engage by extending the fastening elements from the mounting element. Through moving the fastening elements back in the direction of the mounting element the fastening elements can be released from the clearances and again moved within the rails or entirely released from the rail system.

According to a further advantageous embodiment the mounting elements comprise an individually configurable marking surface on one of its lateral surfaces. The marking surface is preferentially arranged on the lateral surface of the mounting elements which in the hooked-in state of the holding device faces away from the centre console so that the marking surface is easily legible to the vehicle occupants. The marking surface for example can be embodied in color, while a plurality of holding devices arranged in a rail system can have marking surfaces with different colors, so that for example a separate holding device for each vehicle occupant can be arranged in the vehicle, which can be assigned to the individual occupant through a color code of the marking surfaces. The marking surface can be configured as required, for example by means of colors, lettering or motifs and can for example consist of Plexiglas.

In order to achieve optimum adaptability of the holding element to the object to be stowed away the holding element according to a further embodiment of the invention is formed of a flexible material. In that the holding element consists of a flexible material it can also be wrapped around the mounting elements it can for example also be wrapped around the mounting elements in a position of non-use in order to take up as little space as possible. The holding element can for example consist of a fabric or leather material.

The invention furthermore relates to a centre console of a motor vehicle which comprises a rail system in which the holding device designed and further developed as above can be arranged.

The invention furthermore relates to a use of a holding device designed and further developed as carry bag as above, which particularly while driving can be hooked into a rail system arranged within the interior space of a motor vehicle. The carry bag can for example serve for the storage of articles flying around in the car such as keys, parking ticket, cigarettes or children's toys, which can also be taken along as carry bag by releasing the carry bag from the rail system when leaving the vehicle. Furthermore, the carry bag can also be used as shopping bag as a result of which unnecessary plastic bags no longer fly around in the vehicle and the vehicle occupants always have a shopping bag available in the vehicle, even if the vehicle occupants make a sudden decision to go shopping. After the utilization as shopping bag the carry bag can be re-deposited in the rail system within the motor vehicle in a space-saving manner for example by wrapping it around the mounting elements.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
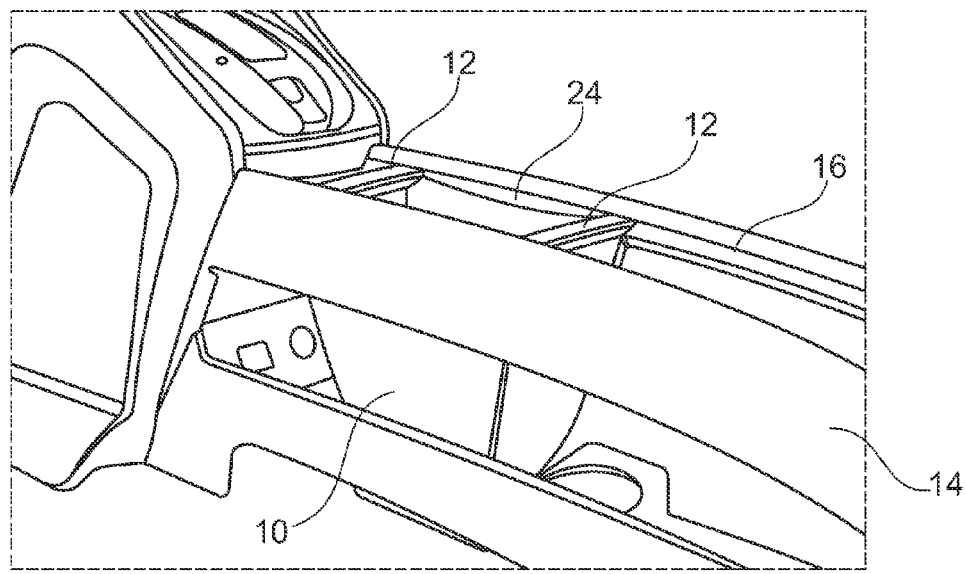
FIG. 1 a schematic perspective representation of an arrangement of a holding device according to an embodiment of the invention in a rail system.

FIG. 1 shows a holding device according to an embodiment of the invention for the holding of articles of daily use which can be arranged in an interior space of a motor vehicle. The holding device comprises a holding element 10 and two mounting elements 12 in which the holding element 10 can be fastened. As is shown in FIG. 1, the holding device can be hooked into a rail system 16 arranged in a centre console 14 of a motor vehicle by means of the mounting elements 12 and moved within the rail system 16. Here, the mounting elements 12, which preferentially consist of aluminum or a plastic, can be guided freely moveable within the rail system 16 independent of each other.

Figure 3:
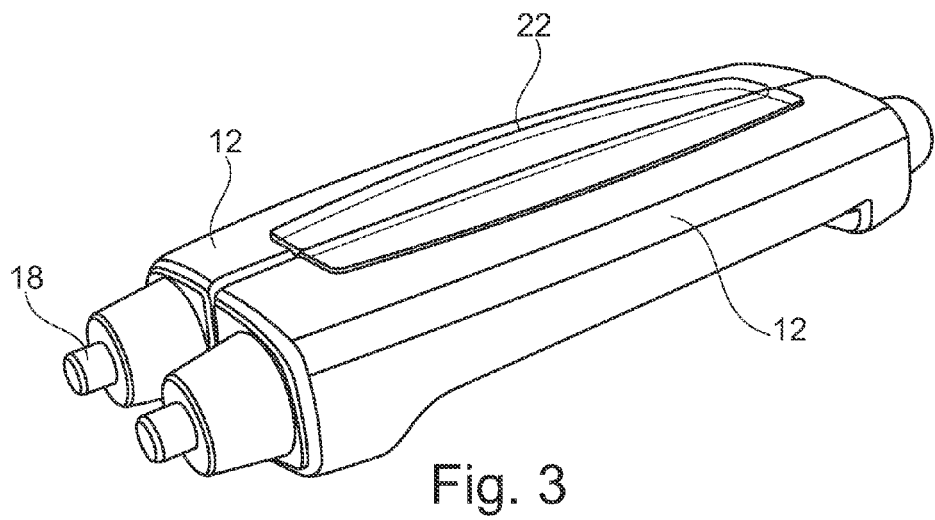
FIG. 3 a schematic perspective representation of a mounting element according to the invention according to a first embodiment.

Articles of daily use which could be required while driving such as road maps, handbags, mobile phone, purse or toys of children travelling along can be deposited in the holding element 10. At the same time, the holding element 10 can be utilized as carry bag for example as shopping bag, which can be hooked into the rail system 16 arranged within the interior space of the motor vehicle by means of the mounting elements 12. By sliding the mounting elements 12 the holding element 10 hooked into the rail system 16 can be closed or opened. FIG. 1 shows the holding element 10 in an opened state. If the mounting elements 12 are pushed together as shown in FIG. 3 the holding element 10 is preferentially closed. The rail system 16 preferentially comprises two rails which run parallel to each other in which the preferentially rod-shaped mounting elements 12 can be hooked with pin-shaped fastening elements 18 fastened at their two end sections.

Figure 2:
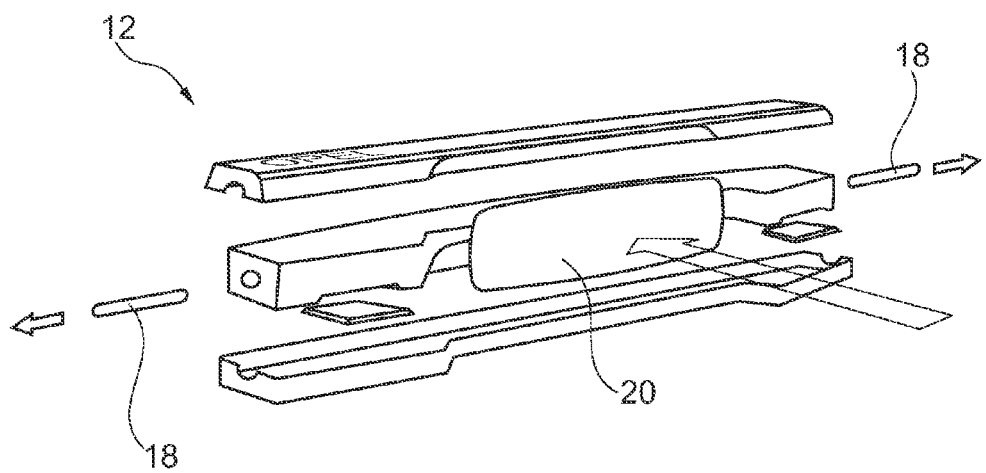
FIG. 2 a schematic exploded representation of a mounting element according to an embodiment of the invention.

As is shown in FIG. 2, the pin-shaped fastening elements 18 can be moved within the mounting element 12 by means of an actuation element 20 arranged on the mounting elements 12. The actuation element 20 is for example configured as a push button arranged on a lateral surface of the mounting element 12. The fastening elements 18 can be moved a certain distance out of or also back into the interior space of the mounting element 12 by means of the actuation element 20. The actuation element 20 is preferentially coupled to the pin-shaped fastening elements 18, so that the fastening elements 18 can be moved by means of the actuation element 20. For example, the fastening elements 18 can be moved or retracted in the direction of the mounting elements 12 by actuating the actuation element 20 so that the fastening elements 18 are unhooked from the rails of the rail system 16 and the holding element 10 or the holding device can be released from the rails. The fastening elements 18 arranged on the opposite ends of a mounting element 12 can be coupled to each other by means of a spring mechanism. Through the spring mechanism, the fastening elements 18 can be easily moved in the rail system 16 within the mounting element 12 for fastening and releasing the holding device. In that two fastening elements 18 located opposite each other are coupled to each other by means of a spring mechanism, these can be moved as a function of each other which facilitates the movement sequence on inserting and releasing the fastening elements 18 in the rail system 16.

For the safe, non-slip fastening of the mounting elements 12 in the rail system 16, the rail system 16 can preferentially comprise clearances 24 in which the fastening elements 18 of the mounting elements 12 can be engaged. Particularly when driving through sharp curves the mounting elements 12 can be fixed in a fixed position as a result, so that the article placed in the holding element 10 can be securely stored. The clearances 24 are preferentially arranged in the region of the rails of the rail system 16, in which the fastening elements 18 through extending of the fastening elements 18 from the mounting element 12 can engage. By moving the fastening elements 18 back in the direction of the mounting element 12 the fastening elements 18 can be released from the clearances 24 and again moved within the rails or entirely released from the rail system 16.

FIG. 3 shows two mounting elements 12 arranged next to each other, which on one of their lateral surfaces comprise an individually configurable marking surface 22. The marking surface 22 is preferentially arranged on the lateral surface of the mounting elements 12, which in the hooked-in state of the holding device faces away from the centre console, so that the marking surface 22 is easily visible to the vehicle occupants. The marking surface 22 can for example be configured in color, wherein a plurality of holding devices arranged in a rail system 16 can comprise marking surfaces 22 with different colors, so that for example a separate holding device is arranged in the vehicle for each vehicle occupant, which can be assigned to the individual occupant through a color code of the marking surface 22. The marking surface 22 can be configured as desired, for example by means of colors, lettering or motifs, and can for example consist of Plexiglas.

Figure 4:
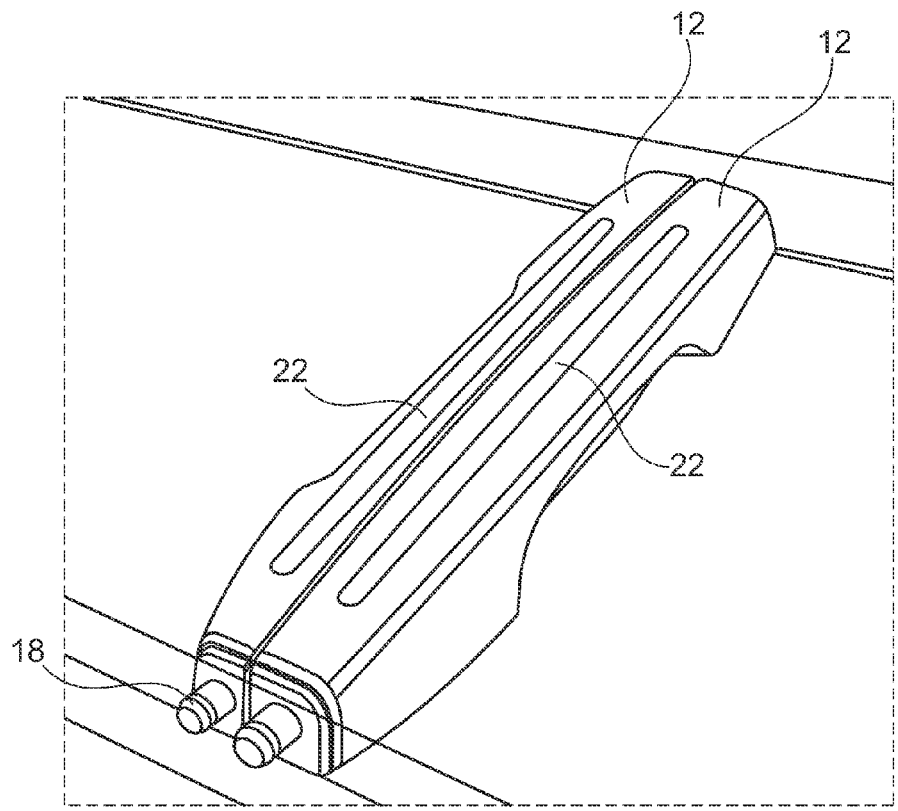
FIG. 4 a schematic perspective representation of a mounting element according to the invention according to a second embodiment.

FIG. 4 shows a further possible embodiment of a marking surface 22, wherein the marking surface 22 does not extend over two mounting elements 12 which belong together as shown in FIG. 3, but is limited to one mounting element 12.

Figure 5:
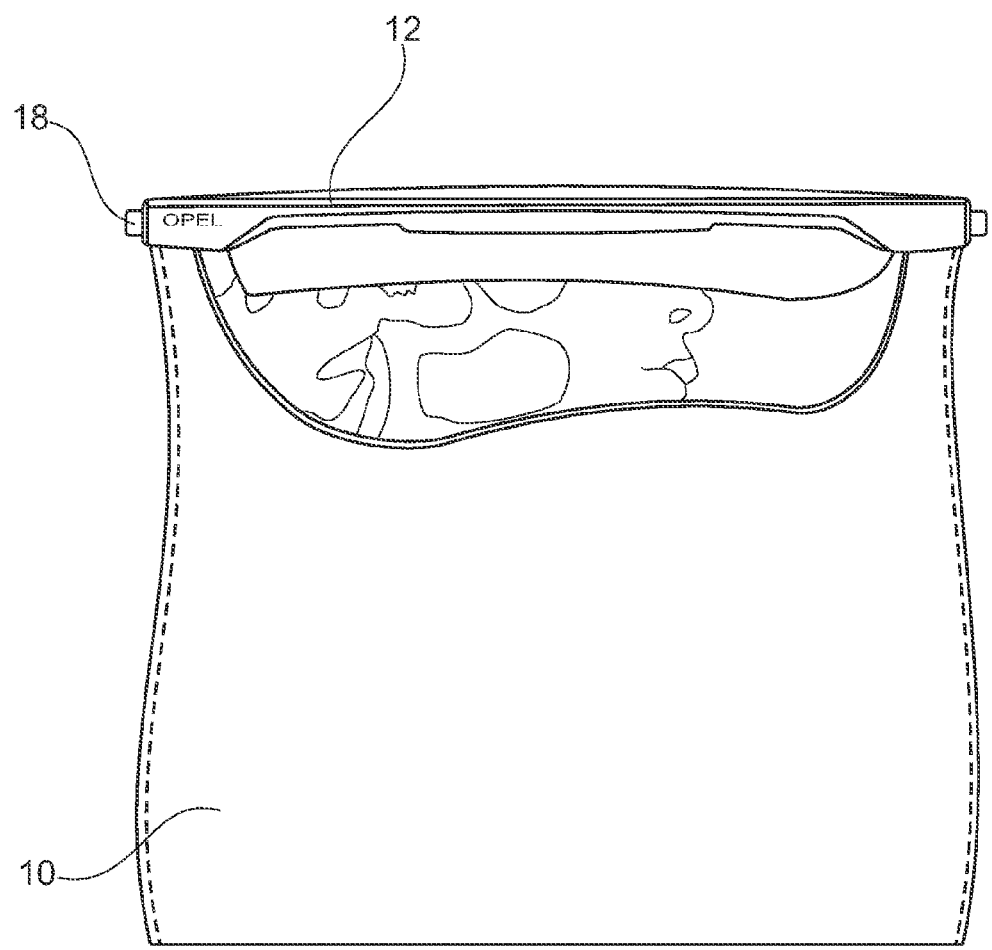
FIG. 5 a schematic representation of a front view of a holding device according to an embodiment of the invention.

FIG. 5 shows a holding device according to the invention which is embodied as carry bag. The holding element 10 of the holding device is preferentially produced of a flexible material, for example a fabric or leather. The carry bag can for example serve for the storing of articles flying around in the car such as keys, parking ticket, cigarettes or also children's toys which by releasing the carry bag from the rail system 16 can also be taking along as carry bag when leaving the vehicle. Furthermore, the carry bag can also be used as shopping bag, as a result of which unnecessary plastic bags no longer fly around in the vehicle and the vehicle occupants always have a shopping bag available in the vehicle, even if the vehicle occupants should suddenly decide to go shopping. Following utilization as shopping bag, the carry bag can be re-deposited within the motor vehicle by wrapping it around the mounting elements 12 in the rail system 16.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A holding device adapted to hold an article and arranged in an interior space of a motor vehicle, comprising:
    a holding element formed of a flexible material;
    at least two mounting elements adapted to fasten the holding element; and
    a rail system adapted to receive the at least two mounting elements and adapted for an arrangement within the interior space of the motor vehicle in such a manner that the at least two mounting elements can be moved within the rail system independent of each other.

2. The holding device according to claim 1, wherein the rail system is arranged in a center console of the motor vehicle.

3. The holding device according to claim 1, wherein each mounting element comprises a pin-shaped fastening element adapted to fasten the holding device in the rail system.

4. The holding device according to claim 3, wherein each pin-shaped fastening element is movable within the respective mounting element and includes an actuation element arranged on the respective mounting element.

5. The holding device according to claim 4, wherein each actuation element is a push button arranged on a lateral surface of the respective mounting element.

6. The holding device according to claim 4, wherein the rail system comprises clearances in which each pin-shaped fastening element can engage.

7. The holding device according to claim 1, wherein each mounting element includes a lateral surface including an individually configurable marking surface.

8. A holding device adapted to hold an article and arranged in an interior space of a motor vehicle, comprising:
    a rail system adapted for an arrangement within the interior space of the motor vehicle;
    a holding element having an open configuration and a closed configuration; and
    mounting elements adapted to fasten the holding element and to independently engage the rail system, wherein the mounting elements are adapted to be moved to abut one another and position the holding element in the closed configuration, and wherein the mounting elements are adapted to be moved away from one another to position the holding element in the open configuration.

9. The holding device according to claim 8, wherein the rail system is arranged in a center console of the motor vehicle.

10. The holding device according to claim 8, wherein the mounting elements each comprise a pin-shaped fastening element adapted to fasten the holding device to the rail system.

11. The holding device according to claim 8, wherein each pin-shaped fastening element is movable within the respective mounting element and includes an actuation element arranged on the respective mounting element.

12. The holding device according to claim 11, wherein each actuation element is a push button arranged on a lateral surface of the respective mounting element.

13. The holding device according to claim 11, wherein the rail system comprises clearances in which each pin-shaped fastening element can engage.

14. The holding device according to claim 8, wherein the holding element is formed of a flexible material.

15. The holding device according to claim 8, wherein each mounting element includes a lateral surface having an individually configurable marking surface.

* * * * *